Oct. 27, 1942.  B. SCHROETER ET AL  2,300,237
STABILIZER ROD
Filed Sept. 18, 1940
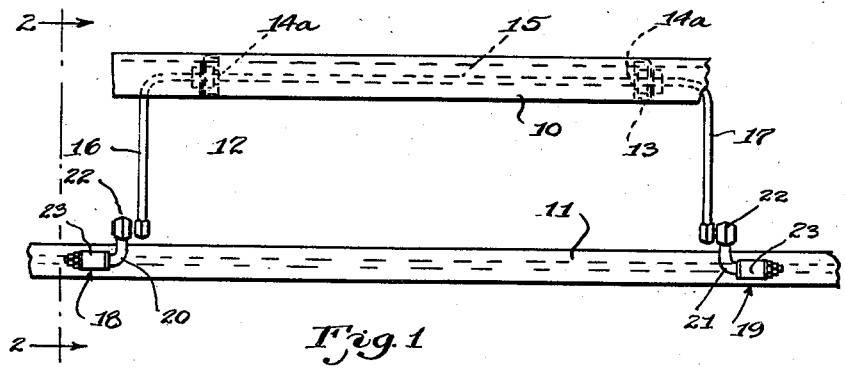
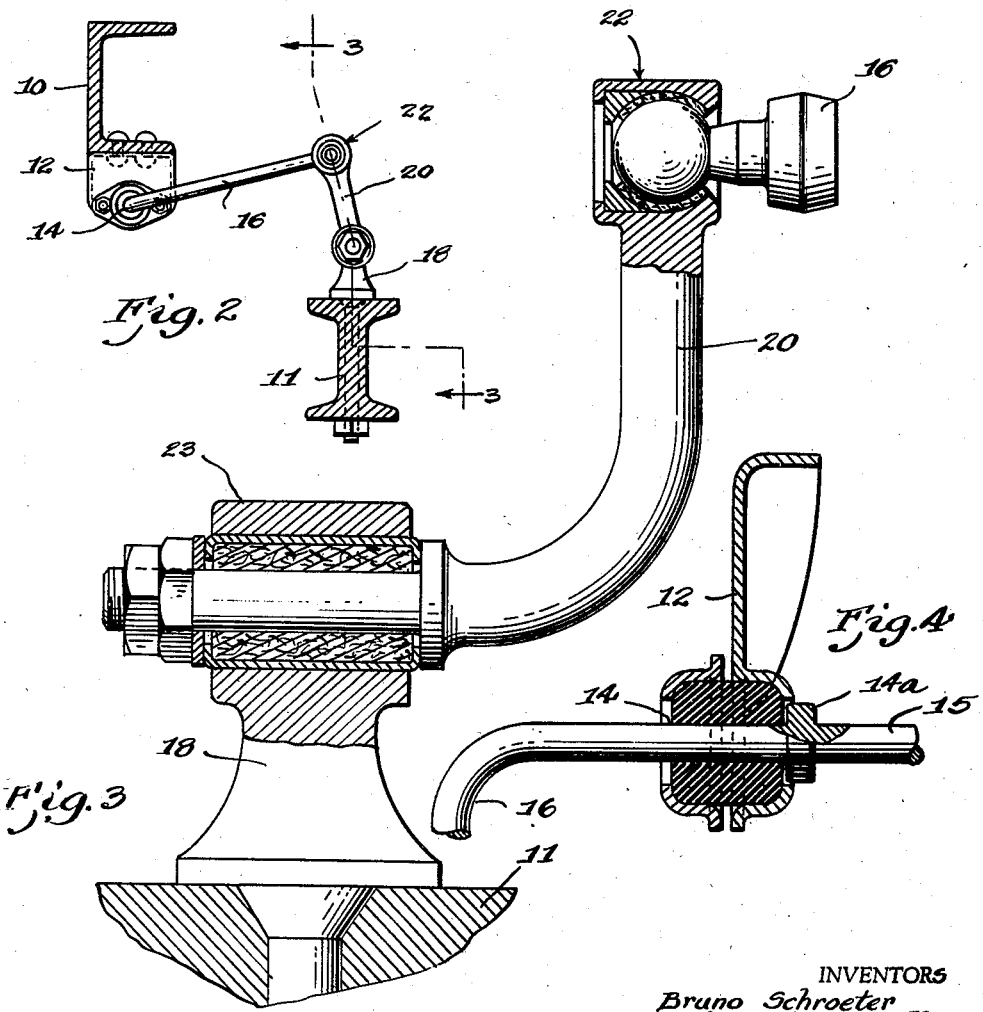
INVENTORS
Bruno Schroeter
Samuel McCarl Scully
BY Barnes, Kisselle, Laughlin & Raisch
ATTORNEYS Patented Oct. 27, 1942

2,300,237

UNITED STATES PATENT OFFICE 2,300,237

STABILIZER ROD

Bruno Schroeter and Samuel McCarl Scully, Detroit, Mich., assignors to O. & S. Bearing Company, Detroit, Mich., a corporation of Michigan Application September 18, 1940, Serial No. 357,243

4 Claims. (Cl. 267—11)

This invention relates to a stabilizer rod for controlling the movement between the spring suspended frame of a vehicle and the axle.

Due to the so-called "soft spring" mounting of vehicle bodies at the present time, there is apt to be an objectionable swaying of the body relative to the axle unless means is provided to control the movement between the two.

It is an object of the present invention to provide a stabilizer rod which performs two functions; first, controlling the body sway by tending to keep the car frame and the axle parallel; and, secondly, to prevent side shifting of the body with respect to the axle. It is a further object of the invention to provide the proper connections between a sway bar and the frame whereby suitable permanent bearings may be used in the moving joints.

Other objects and features of the invention will be brought out in the following description and claims.

In the drawing:

Fig. 1 illustrates the relationship between a transverse member on the frame and the front axle, this view being a top view.

Fig. 2 is a view taken on lines 2—2 of Fig. 1.

Fig. 3 is an enlarged sectional view on lines 3—3 of Fig. 2 showing the bearing connections.

Fig. 4 illustrates the details of the connection between the frame and the stabilizer rod.

Referring to the drawing, in Fig. 1 at 10 is shown a transverse member of a vehicle frame and at 11 is shown a front axle. Fig. 1 is a view looking down on these two members. Depending from the frame member 10 are two brackets 12 and 13, each having a bearing 14 at the lower end thereof, see Fig. 2. A stabilizer bar or rod consists of a U-shaped member having a base 15 and two parallel arms 16 and 17. These arms extend toward the axle 11 on which spaced posts 18 and 19 are mounted. Between the arms 16 and 17 and posts 18 and 19 are links 20 and 21 respectively. These are connected at their upper end by a ball joint 22 shown in detail in Fig. 3. At their lower ends they are connected to the posts 18 and 19 by a cylinder joint or bearing 23, also shown in Fig. 3. The base of the U-shaped bar is rotatably but not slidably mounted in the brackets 12 and 13. Collars 14a located rigidly on base 15 are positioned outside brackets 12 and 13 to prevent sliding of base 15 relative to frame member 10.

Details of bearing joint 22 may be found in Patent No. 2,027,560, issued January 14, 1936; and of bearing 23 in Patent No. 2,069,781, issued February 9, 1937. Each bearing must be able to withstand end-thrust forces and each is designed for this purpose. When installed, it will be seen that the stabilizer bar will prevent side sway of the body frame relative to the axle. Also, if the body frame is moved out of horizontal balance by road forces, the stabilizer bar will tend to bring the body back into parallel relation with the axles. The stabilizer bar can be used on both front and back axles.

We claim:

1. An anti-sway bar for an automobile having a frame and an axle comprising a U-shaped bar having a base and parallel arms, having its base rotatably but not slidably mounted on said frame, an L-shaped link connecting each arm of said U-shaped bar with said axle, a ball joint between the end of each arm and one end of its respective link, and a single axis bearing connection between the other end of said links and said axle arranged substantially parallel to said axle whereby said frame and said axle may move toward or away from each other but may not move relatively in a sidesway direction.

2. A stabilizer bar for vehicles of the type having a frame and an axle, comprising a bar having a portion mounted on said frame, arms on said bar extending toward said axle, means on said bar to hold the same against relative sidesway movement with respect to said frame, a bearing post at each of said arms mounted on said axle, an L-shaped link connecting the end of each arm with the bearing posts, and bearing connections between said links and said arms and posts comprising a multiple axis bearing at one end of each link and a single axis bearing at the other.

3. A stabilizer bar for vehicles of the type having a frame and an axle, comprising a U-shaped bar having its base swingably mounted on a frame, a link connecting each arm of said U-shaped bar with said axle, a ball joint between the end of each arm and one end of its respective link, a bearing connection between the other end of said links and said axle comprising a longitudinal inner member parallel with said axle, and an outer surrounding bushing member mounted on said axle whereby the axis of rotation thereof is parallel with the axle.

4. A stabilizer bar for vehicles of the type having a frame and an axle, comprising a bar having a portion mounted on said frame, arms on said bar extending toward said axle, means for mounting said bar on said frame to hold the same against relative sidesway movement with respect to said frame, a link to connect the end of each arm with the axle, and bearing connections between said links and said arms and the axle comprising a multiple axis bearing at one end of each link and a single axis bearing parallel to the axle at the other whereby relative movement between said axle and frame is permitted only in a direction transversely of the axle.

BRUNO SCHROETER.
SAMUEL McCARL SCULLY.